F. R. HALE.
SHIPPING CRATE.
APPLICATION FILED OCT. 29, 1919.

1,350,496.  
Patented Aug. 24, 1920.

Witnesses  
J. S. McCathran  
J. P. Campbell

Inventor  
Frank R. Hale  
By Richard B. Owen,  
Attorney

UNITED STATES PATENT OFFICE.

FRANK RICHARD HALE, OF HARTFORD, CONNECTICUT.

SHIPPING-CRATE.

1,350,496.　　Specification of Letters Patent.　　Patented Aug. 24, 1920.

Application filed October 29, 1919. Serial No. 334,195.

*To all whom it may concern:*

Be it known that I, FRANK R. HALE, a citizen of the United States, residing at Hartford, in the county of Hartford and State of Connecticut, have invented certain new and useful Improvements in Shipping-Crates, of which the following is a specification.

My invention relates to new and useful improvements in a container and more particularly to a shipping crate for eggs.

The principal object of the invention is the provision of novel means for holding the eggs so that breakage thereof will be reduced to a minimum.

Another object resides in the provision of a plurality of egg containers and means for supporting them in a receptacle.

A further object consists in means for closing the receptacle to securely hold the egg containers therein.

With these and other objects in view my invention consists in the novel details of construction and arrangement of parts which will be more clearly understood from the following specification and drawings in which:—

In carrying out my invention I provide a crate or receptacle adapted to hold a plurality of egg containers and each of the containers receives an egg supporting frame.

Figure 1:
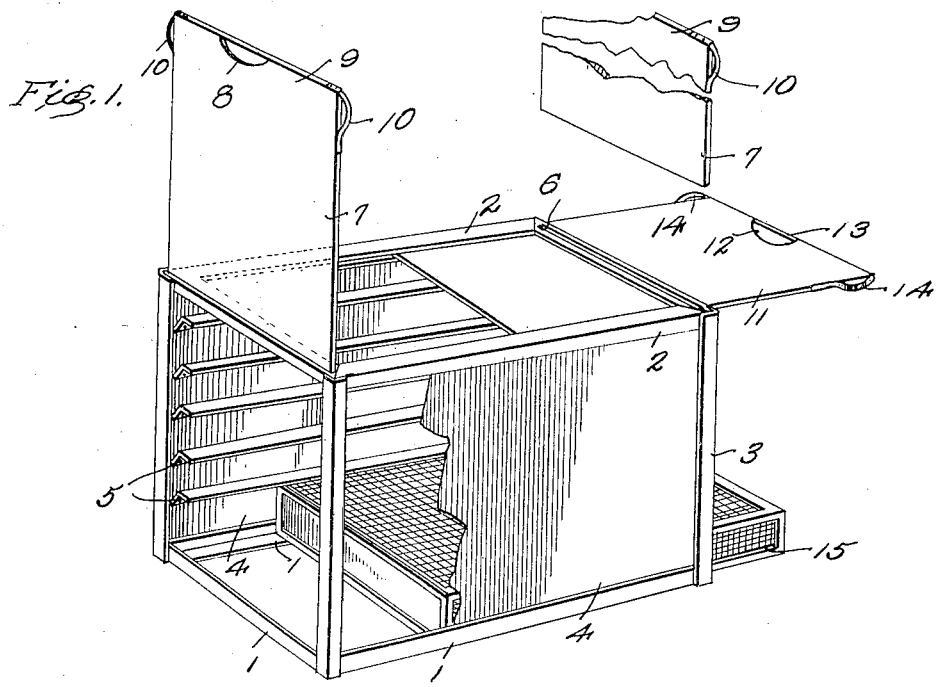
Figure 1 is a perspective of my crate with one egg container partly therein and the top and ends partly removed.
Figure 2:
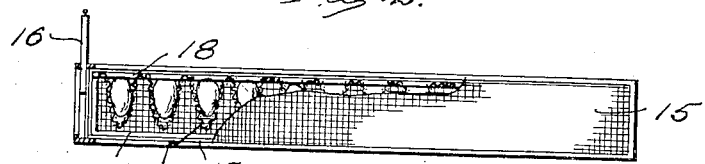
Fig. 2 is a side elevation, partly in section, of one of the egg containers.

The crate or receptacle comprises the bottom angle iron strips 1, the top angle iron strips 2, and vertical angle iron strips 3 connecting the top and bottom strips at the corners. These angle iron strips go forward to make up the frame of the crate or receptacle and side plates 4 are secured in position between the strips. While I have described these plates as being secured in position between the angle iron strips it will be understood, if desired, that they may be made removable. I also preferably secure a plate to the bottom angle iron strips 1 for forming the bottom of the receptacle or crate. A plurality of longitudinally extending angle iron strips 5 are secured to the side plates 4 and as is more clearly illustrated in Fig. 1 of the drawings these angle iron strips 5 are vertically spaced. The ends of the strips are also cut off at an angle for a purpose to be later described.

The end, top angle iron strips, are each provided with a longitudinally extending slot 6 through which is adapted to pass the end plates indicated at 7. The ends plates are cut away at the top to form a recess 8 and a metal strip 9 is secured to the top edge of the plates 7, and across the cut away portion 8, as more particularly illustrated in Fig. 1 of the drawings. Springs 10 are secured to the side edges of the plates 7, adjacent the top ends thereof, so as to securely hold the plates in position when they are lowered through the slot 6. When lowered the springs 10 will be compressed so as to form secure frictional contact with the angle iron strips or with the ends of the slot. The cut away portion 8 forms a space for the hand, beneath the strip 9, and when the hand is inserted the end plates 7 may be raised or lowered.

A top plate 11 is slidably mounted in the frame and is provided with a cutout portion 12 and a strip 13 secured to the end and extending over the cutout portion. Springs 14 are secured to the edges of the top 11, adjacent the outer end, and act in the same manner as the springs 10 of the end plates 7 for securely holding the top plate 11 in closed position. The top plate 11 is of such a length as to leave a space for the end plates 7 when the said top plate 11 is in closed position.

Figure 3:
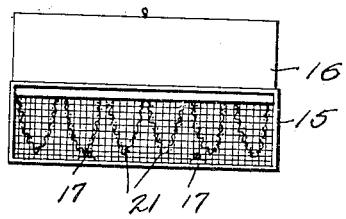
Fig. 3 is an end view of Fig. 2.

A plurality of egg containers 15 are adapted to be supported on the angle iron strips 5. These egg containers are preferably formed of a frame work of metal having wire mesh secured thereto. A sliding door 16 is provided at one end of the container and longitudinally extending strips 17 are secured to the top of the bottom of the containers, as more particularly illustrated in Fig. 3 of the drawings, for a purpose to be later described.

Figure 4:
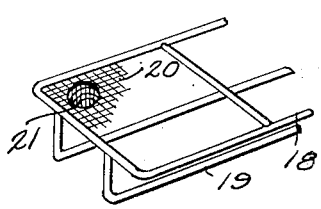
Fig. 4 is a detailed perspective of the egg supporting frame.

An egg supporting frame is adapted to be received in each of the egg containers and this supporting frame is more clearly illustrated in Fig. 4 of the drawings. The supporting frame comprises a top frame work indicated at 18 and runners 19 are secured to the underside of the frame 18. Wire mesh 20 is secured to the frame 18 and is provided with a plurality of spaced pockets 21 which are also formed of wire mesh. These pockets 21 preferably taper and are of such a size as to receive an egg and securely hold the same by frictional contact.

When the crate is to be used the eggs are placed in the pockets 21 of the egg supporting frame. As described these pockets preferably taper and are of such size as to snugly engage the egg and hold the same in position. When the eggs are placed in the pockets the frame 18 is then adapted to be placed in one of the egg containers 15. The sliding door 16 at one end of the container is raised and the frame may be slid into the containers by having the runners 19 engaged on the strips 17. The container is of such a height as to accommodate the frame in such a manner that when the frame is therein the eggs will be securely held in the pockets. When the frame is in position in the container the door 16 is then lowered and it will be seen that the frame will be securely held in the containers. The various containers 15 are then placed upon the angle iron strips 5 and the bottom angle iron strips 1, and when the frames are in position the end plates 7 and top plate 12 will be slid into position and the egg containers will then be held within the crate. The springs 10 on the end plates 7 will securely hold them in closed position and the same is true relative to the spring 14 which will securely hold the top plates 11 in closed position. By cutting the ends of the strips 5 at an angle the containers may be readily slid into position.

From the above detailed description it will be found that I have provided a shipping crate for eggs of such construction that the eggs will be held in such position as to reduce breakage to a minimum. At the same time the crate is of such simple and inexpensive construction as to be adaptable to the trade and may be used a number of times.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claims.

Having fully described my invention what I claim as new and desire to secure for Letters Patent is:—

1. A shipping crate comprising a receptacle formed of an angle iron frame having a bottom and side plates secured thereto, said frame having longitudinally and vertically extending guideways formed in the ends thereof, a cover slidable in the longitudinally extending guideways, end plates slidable in the vertically extending guideways, and removable containers supported in the receptacle.

2. A shipping crate comprising a receptacle formed of an angle iron frame having a bottom and side plates secured thereto, said frame having longitudinally and vertically extending guideways formed in the ends thereof, a cover slidable in the longitudinally extending guideways, end plates slidable in the vertically extending guideways and adapted to engage the ends of the cover, and removable containers supported in the receptacle.

3. A shipping crate comprising a receptacle formed of a frame having a bottom and side plate secured thereto, said frame having longitudinally and vertically extending guideways formed in the ends thereof, a cover slidable in the longitudinally extending guideways, and end plates slidable in the vertically extending guideways.

In testimony whereof I affix my signature in presence of two witnesses.

FRANK RICHARD HALE.

Witnesses:
JAMES J. COYLE,
WILLIAM A. FISKE.